(12) United States Patent
Townsend et al.

(10) Patent No.: US 12,157,556 B2
(45) Date of Patent: *Dec. 3, 2024

(54) METHOD AND SYSTEM FOR FLY-BY-WIRE FLIGHT CONTROL CONFIGURED FOR USE IN ELECTRIC AIRCRAFT

(71) Applicant: BETA AIR, LLC, South Burlington, VT (US)

(72) Inventors: Chris Townsend, Shelburne, VT (US); Joshua E. Auerbach, Waterbury Center, VT (US); Andrew Giroux, Georgia, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,026

(22) Filed: May 25, 2023

(65) Prior Publication Data

US 2023/0312085 A1 Oct. 5, 2023

Related U.S. Application Data

(63) Continuation of application No. 17/515,416, filed on Oct. 30, 2021, now Pat. No. 11,713,109, which is a
(Continued)

(51) Int. Cl.
*B64C 13/50* (2006.01)
*B64C 9/00* (2006.01)
(Continued)

(52) U.S. Cl.
CPC .............. *B64C 13/503* (2013.01); *B64C 9/00* (2013.01); *B64C 13/04* (2013.01); *G06N 20/00* (2019.01); *B64C 2009/005* (2013.01)

(58) Field of Classification Search
CPC ......... B64C 13/503; B64C 13/04; B64C 9/00; B64C 2009/005; G06N 20/00
See application file for complete search history.

(56) References Cited

U.S. PATENT DOCUMENTS 5,493,497 A 2/1996 Buus
7,551,989 B2 6/2009 Knotts et al.
(Continued)

FOREIGN PATENT DOCUMENTS

KR 20100061946 A 6/2010

OTHER PUBLICATIONS

Extended European Search Report mailed Apr. 9, 2024 for European Application No. 22781953.9, a foreign counterpart to U.S. Pat. No. 11,225,321 (7 pages).
(Continued)

*Primary Examiner* — Rodney A Bonnette
(74) *Attorney, Agent, or Firm* — Lee & Hayes, P.C.

(57) ABSTRACT

In an aspect a system for fly-by-wire flight control configured for use in electric aircraft including at least a sensor, wherein the sensor is communicatively connected a pilot control and configured to detect a pilot input from the pilot control and generate, as a function of the pilot input, command datum. A system includes a flight controller, the flight controller including a computing device and configured to perform a voting algorithm, wherein performing the voting algorithm includes determining that the sensor is an allowed sensor, wherein determining that the sensor is an allowed sensor includes determining that the command datum is an active datum, determining the command datum is an admissible datum, generating, as a function of the command datum and the allowed sensor, a control surface datum wherein the control surface datum is correlated to the pilot input.

20 Claims, 7 Drawing Sheets

Related U.S. Application Data continuation of application No. 17/218,387, filed on Mar. 31, 2021, now Pat. No. 11,225,321.

(51) Int. Cl.
*B64C 13/04* (2006.01)
*G06N 20/00* (2019.01)

(56) References Cited

U.S. PATENT DOCUMENTS

| | | |
|---|---|---|
| 8,386,093 B2 | 2/2013 | Lin et al. |
| 8,401,716 B2 * | 3/2013 | Ciholas .................... B64C 9/10 |
| | | 244/76 R |
| 8,538,602 B2 | 9/2013 | Brot |
| 8,690,101 B2 | 4/2014 | Ahmad et al. |
| 8,935,015 B2 | 1/2015 | Olsoe et al. |
| 9,690,291 B2 | 6/2017 | Ouellette et al. |
| 10,926,869 B2 * | 2/2021 | Huynh .................. B64C 13/503 |
| 2011/0251739 A1 | 10/2011 | Tomas et al. |
| 2013/0311006 A1 * | 11/2013 | Ahmad ................ G05D 1/0077 |
| | | 701/3 |
| 2015/0108281 A1 | 4/2015 | Antraygue |
| 2020/0070966 A1 * | 3/2020 | Alfred ................... B64C 27/006 |
| 2020/0130814 A1 * | 4/2020 | Therien ............... B64C 13/0421 |
| 2020/0201358 A1 * | 6/2020 | Gorsica ................ G05D 1/0016 |

OTHER PUBLICATIONS

Robles, R. Rodriguez, Flight Control Laws Carefree Handling Clearance of a Highly Manoeuvrable Aircraft Using Multi-Strategy Adaptive Global Optimization, dated Jul. 2017 (16 pages).

* cited by examiner

METHOD AND SYSTEM FOR FLY-BY-WIRE FLIGHT CONTROL CONFIGURED FOR USE IN ELECTRIC AIRCRAFT

CROSS-REFERENCE TO RELATED APPLICATIONS

This application is a continuation of Non-provisional U.S. patent application Ser. No. 17/515,416, filed on Oct. 30, 2021, entitled "METHOD AND SYSTEM FOR FLY-BY-WIRE FLIGHT CONTROL CONFIGURED FOR USE IN ELECTRIC AIRCRAFT," which is a continuation of Non-provisional U.S. patent application Ser. No. 17/218,387, filed on Mar. 31, 2021, entitled "METHOD AND SYSTEM FOR FLY-BY-WIRE FLIGHT CONTROL CONFIGURED FOR USE IN ELECTRIC AIRCRAFT," each of which is incorporated by reference herein in their entirety.

FIELD OF THE INVENTION

The present invention generally relates to the field of flight controls. In particular, the present invention is directed to a method and system for fly-by-wire flight control configured for use in electric aircraft.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo. A method and system for estimating propulsor output is a necessary component of a safe eVTOL aircraft, and aircraft in general to assess maneuverability and capabilities of aircraft through flight envelope.

SUMMARY OF THE DISCLOSURE

In an aspect a system for fly-by-wire flight control configured for use in electric aircraft is described. The system includes a flight controller, wherein the flight controller is configured to perform a voting algorithm, and wherein performing the voting algorithm further includes, receiving at least a command datum from at least a sensor, determining the at least a command datum is an admissible datum and generating, as a function of the at least a command datum and the admissible datum, an electrical signal suitable for movement of a control surface on the electric aircraft. The system further includes at least an actuator communicatively connected to the flight controller, the at least an actuator configured to receive the electrical signal from the flight controller and adjust thrust of a propulsor, as a function of the electrical signal.

In another aspect a method for fly-by-wire flight control configured for use in electric aircraft includes receiving, at a flight controller, at least a command datum from at least a sensor, determining, at the flight controller, the at least a command datum is an admissible datum, generating, as a function of the at least a command datum and the admissible datum, an electrical signal suitable for movement of a control surface on the electric aircraft, receiving, by at least an actuator communicatively connected to the flight controller the electrical signal from the flight controller, and adjusting thrust, by the at least an actuator, of a propulsor, as a function of the electrical signal.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for fly-by-wire flight control configured for use in an electric aircraft. In an embodiment, a system for fly-by-wire flight control configured for use in electric aircraft includes at least a sensor, wherein the at least a sensor is communicatively connected to at least a pilot control and configured to detect a pilot input from the at least a pilot control and generate, as a function of the pilot input, at least a command datum. A system includes a flight controller, the flight controller including a computing device and configured to perform a voting algorithm, wherein performing the voting algorithm includes determining that the at least a sensor is an allowed sensor, wherein determining that the at least a sensor is an allowed sensor includes determining that the at least a command datum is an active datum, determining the at least a command datum is an admissible datum, generating, as a function of the at least a command datum and the allowed sensor, a control surface datum wherein the control surface datum is correlated to the pilot input.

Figure 1:
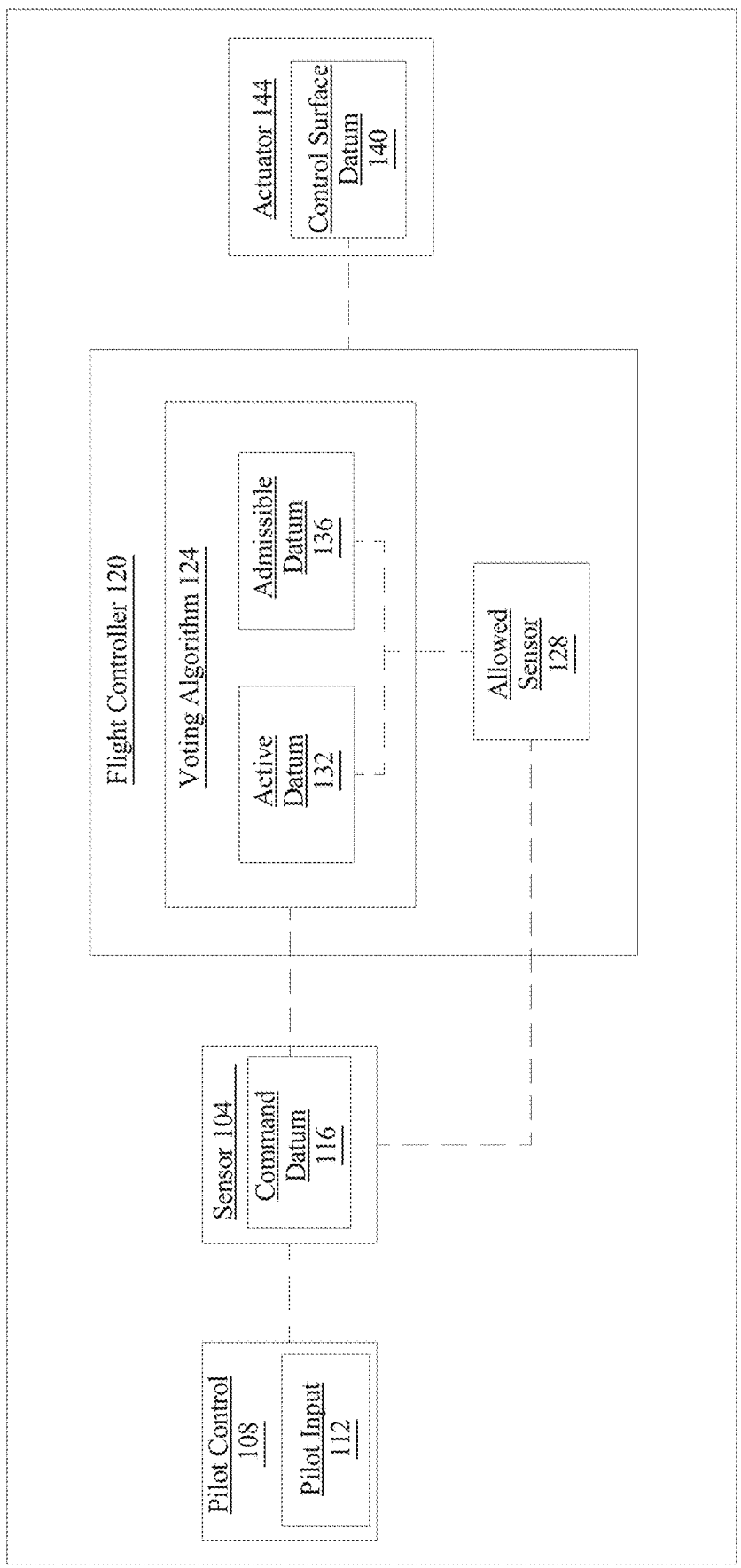
FIG. 1 is an exemplary system for fly-by-wire flight control configured for use in electric aircraft presented in block diagram form.

Referring now to FIG. 1, exemplary system 100 for fly-by-wire control configured for use in electric aircraft is illustrated in block diagram form. System 100 includes at least a sensor 104. At least a sensor 104 is communicatively coupled to at least a pilot control 108. "Communicative coupling", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. At least a sensor 104 communicatively connected to at least a pilot control 108 may include a sensor disposed on, near, around or within at least pilot control 108. At least a sensor 104 may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor 104 may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, may alter aircraft usage pursuant to sensor readings. At least a sensor 104 is configured to detect pilot input 112 from at least pilot control 108. At least pilot control 108 may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. At least pilot control 108 may be physically located in the cockpit of the aircraft or remotely located outside of the aircraft in another location communicatively connected to at least a portion of the aircraft. "Communicatively couple", for the purposes of this disclosure, is a process whereby one device, component, or circuit is able to receive data from and/or transmit data to another device, component, or circuit; communicative coupling may be performed by wired or wireless electronic communication, either directly or by way of one or more intervening devices or components. In an embodiment, communicative coupling includes electrically coupling an output of one device, component, or circuit to an input of another device, component, or circuit. Communicative coupling may be performed via a bus or other facility for intercommunication between elements of a computing device. Communicative coupling may include indirect connections via "wireless" connection, low power wide area network, radio communication, optical communication, magnetic, capacitive, or optical coupling, or the like. At least pilot control 108 may include buttons, switches, or other binary inputs in addition to, or alternatively than digital controls about which a plurality of inputs may be received. At least pilot control 108 is configured to receive pilot input 112. Pilot input 112 may include a physical manipulation of a control like a pilot using a hand and arm to push or pull a lever, or a pilot using a finger to manipulate a switch. Pilot input 112 may include a voice command by a pilot to a microphone and computing system consistent with the entirety of this disclosure.

With continued reference to FIG. 1, at least a sensor 104 is configured to generate, as a function of pilot input 112, command datum 116. A "command datum", for the purposes of this disclosure, refers an electronic signal representing at least an element of data correlated to pilot input 112 representing a desired change in aircraft conditions as described in the entirety of this disclosure. A "datum", for the purposes of this disclosure, refers to at least an element of data identifying and/or a pilot input or command. At least pilot control 108 may be communicatively connected to any other component presented in system, the communicative connection may include redundant connections configured to safeguard against single-point failure. Pilot input 112 may indicate a pilot's desire to change the heading or trim of an electric aircraft. Pilot input 112 may indicate a pilot's desire to change an aircraft's pitch, roll, yaw, or throttle. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about it's longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input 112, when referring to throttle, may refer to a pilot's desire to increase or decrease thrust produced by at least a propulsor. Command datum 116 may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor 104 may include circuitry, computing devices, electronic components or a combination thereof that translates pilot input 112 into at least an electronic signal command datum 116 configured to be transmitted to another electronic component.

With continued reference to FIG. 1, system 100 includes flight controller 120. Flight controller 120 is communicatively connected to at least a pilot control 108 and at least a sensor 104. Communicative coupling may be consistent with any embodiment of communicative coupling as described herein. Flight controller 120 is configured to perform voting algorithm 124. "Flight controller", for the purposes of this disclosure, refers to a component or grouping of components that control trajectory of the electric aircraft by taking in signals from a pilot and output signals to at least a propulsor and other portions of the electric aircraft like control surfaces to adjust trajectory. Flight controller may mix, refine, adjust, redirect, combine, separate, or perform other types of signal operations to translate pilot desired trajectory into aircraft maneuvers. Flight controller, for example, may take in a pilot input of moving an inceptor stick, the signal from that move may be sent to flight controller, which performs any number or combinations of operations on those signals, then sends out output signals to any number of aircraft components that work in tandem or independently to maneuver the aircraft in response to the pilot input. Flight controller may condition signals such that they can be sent and received by various components throughout the electric aircraft.

Additionally, flight controller 120 may include and/or communicate with any computing device, including without limitation a microcontroller, microprocessor, digital signal processor (DSP) and/or system on a chip (SoC). Flight controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller may be designed and configured to operate electronic aircraft via fly-by-wire. Flight controller is communicatively connected to each propulsor; as used herein, flight controller is communicatively connected to each propulsor where flight controller is able to transmit signals to each propulsor and each propulsor is configured to modify an aspect of propulsor behavior in response to the signals. As a non-limiting example, flight controller may transmit signals to a propulsor via an electrical circuit connecting flight controller to the propulsor; the circuit may include a direct conductive path from flight controller to propulsor or may include an isolated coupling such as an optical or inductive coupling. Alternatively, or additionally, flight controller may communicate with a propulsor of plurality of propulsors using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple flight controller to propulsors. Persons skilled in the art, upon reviewing the entirety of this disclosure, will be aware of various ways to monitor resistance levels and apply resistance to linear thrust control, as used and described herein.

Flight controller 120 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Fall back flight control system 100 may include a single computing device operating independently, or may include two or more computing device operating in concert, in parallel, sequentially or the like; two or more computing devices may be included together in a single computing device or in two or more computing devices. Flight controller 120 may interface or communicate with one or more additional devices as described below in further detail via a network interface device. Network interface device may be utilized for connecting flight controller 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 120 may include but is not limited to, for example, a computing device or cluster of computing devices in a first location and a second computing device or cluster of computing devices in a second location. Fall back flight control system 100 may include one or more computing devices dedicated to data storage, security, distribution of traffic for load balancing, and the like. Flight controller 120 may distribute one or more computing tasks as described below across a plurality of computing devices of computing device, which may operate in parallel, in series, redundantly, or in any other manner used for distribution of tasks or memory between computing devices. Flight controller 120 may be implemented using a "shared nothing" architecture in which data is cached at the worker, in an embodiment, this may enable scalability of flight controller 120 and/or computing device.

Flight controller 120 may be designed and/or configured to perform any method, method step, or sequence of method steps in any embodiment described in this disclosure, in any order and with any degree of repetition. For instance, flight controller 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Flight controller 120, as well as any other component present within disclosed systems, as well as any other components or combination of components may be connected to a controller area network (CAN) which may interconnect all components for signal transmission and reception.

Flight controller 120 is configured to perform a voting algorithm 124, wherein performing voting algorithm 124 includes determining that at least a sensor 104 is an allowed sensor 128. Voting algorithm 124 may also be configured to translate pilot input 112 into commands suitable for movement of control surfaces mechanically coupled to an electric aircraft. For example, and without limitation, there may be more than one allowed sensor 128 with associated command datums 116 determined to be active and admissible. Active and/or admissible command data 116 may be received by voting algorithm. Voting algorithm may combine active and/or admissible command data to generate and/or output control surface datum 140; combining may include without limitation any form of mathematical aggregation, such as a sum, a weighted sum, a product, a weighted product, a triangular norm such as a minimum, bounded product, algebraic product, drastic product, or the like, a triangular co-norm such as a maximum, bounded sum, algebraic sum, drastic sum, or the like, an average such as an arithmetic and/or geometric mean, or the like. One of ordinary skill in the art, after reviewing the entirety of this disclosure, would appreciate that averaging (finding the mean) of a plurality of command data 116 from a plurality of allowed sensors 128 is only one example of mathematical or other operations suitable to take all "votes" into account when generating a control surface datum 140. Allowed sensor 128 includes a sensor that has not been banned by flight controller 124. One of ordinary skill in the art would appreciate, after reviewing the entirety of this disclosure, that any number of flight controllers can perform any number of the herein disclosed steps in combination with other computing devices or systems, and perform these calculations relating to any number of components, banning and unbanning any component in system 100. Flight controller 120 determines if at least a sensor 104 is an allowed sensor 104 by determining if command datum 116 is an active datum 132. An "active datum", for the purposes of this disclosure, refers to a command received within a predetermined and expected time limit. For example and without limitation, flight controller 120 may calculate when at least a sensor is supposed to transmit command datum 116, and if that command datum 116 arrives outside of that time limit or time range, then command datum 116 is determined to not be an active datum. If flight controller 120 receives command datum 116 within that expected time range, command datum 116 is determined to be active datum 132. Active datum 132 is a safeguard against old or stale data, wherein stale data may be outdated in view of more recent pilot inputs 112. Flight controller 120 performs voting algorithm 124 in order to determine if command datum 116 is an admissible datum 136. An "admissible datum", for the purposes of this disclosure, refers to an element of data representing a command to move a control surface relating to the electric aircraft within a predetermined and expected admissible range. An "admissible range", for the purposes of this disclosure, refers to a control surface movement correlated to an electric aircraft maneuver that is considered safe in view of environmental conditions, aircraft conditions, mission considerations, and aircraft power considerations. For example, and without limitation, pilot input 112 may be embodied by a pilot moving an inceptor stick to the right, at least a sensor 104 detects that input and generates command datum 116, command datum is transmitted to and determined to be an active datum 132 by flight controller 120. Flight controller 120 further takes in information from onboard and offboard sensors that measure environmental conditions like airspeed, angle of attack, and air density, as well as aircraft conditions like battery level. Flight controller 120 then determines, based on command datum 116 is within an admissible range based on those parameters. For example, and without limitation, command datum 116 may command an aircraft to bank to the right, but considering environmental conditions like altitude and propulsor health, command datum 116 may be determined to not be admissible datum 136. Flight controller 120 may perform voting algorithm 124 consistent with any voting algorithm described herein.

With continued reference to FIG. 1, flight controller 120 is configured to ban the at least a sensor 104 that transmitted command datum 116 determined to not be active datum 132. A "ban", for the purposes of this disclosure, refers to one or more flight controller's ability to not consider data from one or more sensors or components determined to not be transmitting useful and accurate data. For example, and without limitation, flight controller 120 may ban one of at least a sensor 104 that does not transmit command datum 116 within a time limit, thereby determining that the data being transmitted is not trustworthy and does not represent pilot input 112 as accurately as possible. Thresholds with which flight controller 120 will be discussed with greater detail with reference to FIGS. 2 and 3. Similarly, flight controller 120 is configured to ban the at least a sensor 104 transmitted command datum 116 determined to not be admissible datum 136. For example, and without limitation, flight controller 120 may determine command datum 116 is not representative of a controls surface movement that correlates to an admissible range of flight maneuvers given a certain engine power availability and air density. Voting algorithm 124 may utilize one or more machine-learning processes consistent with the entirety of this disclosure, and in particular with reference to FIG. 5.

With continued reference to FIG. 1, flight controller 120 is configured to generate, as a function of the command datum 116 and the allowed sensor 128, control surface datum 140 correlated to pilot input 112. Control surface datum 128 may be an electrical signal consistent with any electrical signal as described in this disclosure. Control surface datum 128 may be an electrical signal generated by flight controller 120 that is both active and admissible. Control surface datum 140 would constitute one or more command datums 116 that were determined to be both active datums 132 and admissible datums 136. Control surface datum 140 may be the mean of a plurality of control surface datums, command datums, active datums, admissible datums, or the like, from any number of allowed sensors 128. For example, and without limitation, at least a sensor 104 includes 10 independent sensors detecting pilot input 112. Two sensors were determined to transmit non-active datums and are thus banned. Three sensors were determined to transmit non-admissible datums and are thus banned. The remaining seven allowed sensors would perform one or more mathematical operations on their command datums to output control surface datum 140 that represents a collective value in some way, hence, each sensor that has been allowed has "voted" on what value control surface datum 140 should be. Control surface datum 140 may be a command to move an aileron mechanically coupled to electric aircraft consistent with this disclosure, and with particularity, FIG. 6. Control surface datum 140 may be a command to a propulsor mechanically coupled to an electric aircraft, like an electric motor, propeller, combustion engine, or the like, with particular reference to FIG. 6.

With continued reference to FIG. 1, system 100 includes an actuator 144 which is communicatively connected to flight controller 120 and a control surface of the aircraft. An actuator may include a computing device or plurality of computing devices consistent with the entirety of this disclosure. An actuator may be designed and/or configured to perform any method, method step, or sequence of method steps in any embodiment described in this disclosure, in any order and with any degree of repetition. For instance, an actuator may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. An actuator may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

An actuator may include a piston and cylinder system configured to utilize hydraulic pressure to extend and retract a piston coupled to at least a portion of electric aircraft. An actuator may include a stepper motor or server motor configured to utilize electrical energy into electromagnetic movement of a rotor in a stator. An actuator may include a system of gears coupled to an electric motor configured to convert electrical energy into kinetic energy and mechanical movement through a system of gears. An actuator may include components, processors, computing devices, or the like configured to detect control surface datum 140 flight controller 120. An actuator may be configured to receive control surface datum 140 from flight controller 120. An actuator is configured to move at least a portion of the electric aircraft as a function of control surface datum 140. Control surface datum 140 indicates a desired change in aircraft heading or thrust, flight controller 120 translates pilot input 112 based on a number of operations like voting algorithm 124 into control surface datum 140. That is to say that flight controller 120 is configured to translate a pilot input, in the form of moving an inceptor stick, for example, into electrical signals to at least an actuator that in turn, moves at least a portion of the aircraft in a way that manipulates a fluid medium, like air, to accomplish the pilot's desired maneuver. At least a portion of the aircraft that an actuator moves may be a control surface. An actuator, or any portion of an electric aircraft may include one or more flight controllers 120 configured to perform any of the operations described herein and communicate with each of the other flight controllers 120 and other portions of an electric aircraft.

Still referring to FIG. 1, an actuator is configured to move control surfaces of the aircraft in one or both of its two main modes of locomotion, or adjust thrust produced at any of the propulsors. These electronic signals can be translated to aircraft control surfaces. These control surfaces, in conjunction with forces induced by environment and propulsion systems, are configured to move the aircraft through a fluid medium, an example of which is air. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure. Further, in an embodiment, the actuator may be configured to perform any voting algorithm and/or other algorithm as described in the entirety of this disclosure.

In an embodiment, an actuator may be mechanically coupled to a control surface at a first end and mechanically coupled to an aircraft at a second end. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft.

At least a portion of an electric aircraft may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight.

In an embodiment, at least a portion of the aircraft may include a propulsor, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Figure 2:
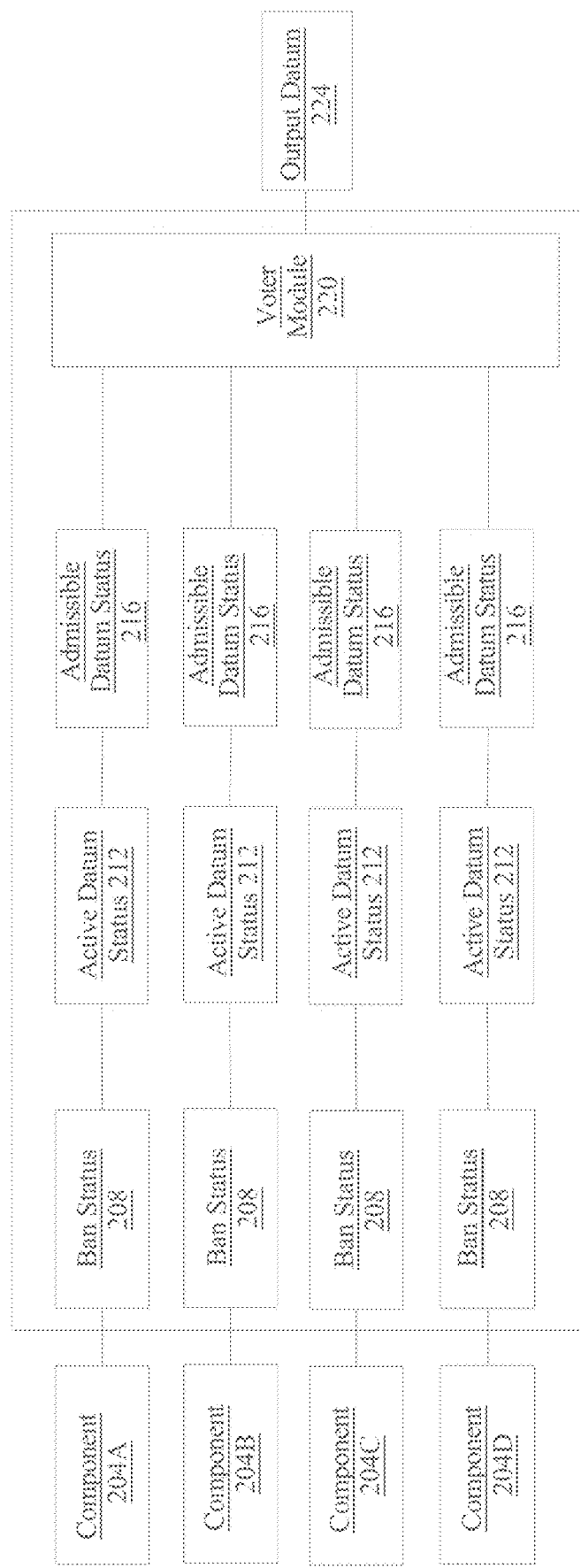
FIG. 2 is an exemplary embodiment of a voting algorithm configured for use in an embodiment of the invention.

Referring now to FIG. 2, an exemplary embodiment of a voting algorithm 200 is presented in block diagram form. Voting algorithm 200 may be the same or similar to voting algorithm 124, or another voting algorithm altogether. Voting algorithm 200 includes component 204A-D. Component 204A-D may include sensors, sensor suites, flight controllers, computing devices, electronic component, or other aircraft component as described herein. For example, and without limitation, component 204A-D, includes four independent sensors, each of which may be at least a sensor 104. Component 204A would indicate, as an electrical signal or element of data, it's ban status 208. A "ban status", for the purposes of this disclosure, refers to a the status of a component within system 100, ban status 208 may be 'banned' or 'unbanned'. If component 204A is banned, its vote will not be counted, as it is not a sensor whose data is usable for generation of control surface datum 140. A system that is banned may be unbanned over multiple iterations of banning algorithm, which will be disclosed hereinbelow. For example, and without limitation, component 204A is not banned, or in other words, the command datum 116 transmitted by component 204A is taken into consideration by voting algorithm 200. Unbanned component 204A then includes active datum status 212. If command datum 116 is transmitted from an unbanned sensor, herein component 204A, and is transmitted within a predetermined time limit, time range, speed, or in line with another or combination of other temporal considerations, active datum status 212 is determined. Active datum status 212 includes whether or not the command datum was transmitted to flight controller 120 in a temporally appropriate manner. If so, command datum 116 is determined to contain admissible datum status 216. Admissible datum status 216 includes whether the command datum 116 is an admissible datum, or that it correlates to an admissible control surface datum. One of ordinary skill in the art would appreciate, after reviewing the entirety of this disclosure, that the determination of active datum status 212 and admissible datum status 212 is not necessarily sequential, that there is any particular order in which the determinations are made, that the determinations are made separately, that the same computing systems are used in the determinations of each status relating to a single component, or multiple computing systems are used in the determination of statuses relating to multiple components.

Continuing to refer to FIG. 2, voting algorithm 200, after the determination that command datums relating to allowed components 204A-D are active datums (at active datum status 212) and admissible datums (at admissible datum status 216), command datums in the form of electrical signals are transmitted to voter module 220. Voter module 220 may be any computing device or component thereof as described in this disclosure. Voter module 220 may include an analog circuit, digital circuit, combinatorial logic circuit, sequential logic circuit and/or another circuit suitable for use in an embodiment of the invention. Voter module 220 may perform any of the method steps, operations, calculations, or other manipulations of command datums relating to allowed components 204A-D. Voter module 220, for example, may receive four command datums relating to the change in an aircraft's yaw, as described in this disclosure. Voter module 220 may average the command datums and output the average as output datum 224. Output datum 224 would therefore be the mean of all the command datums associated with each of allowed components 204A-D. Output datum 224 may be the same as or similar to control surface datum 140. Output datum 224 may be transmitted to any portion of an electric aircraft, including but not limited to computing devices, flight controllers, signal conditioners, actuators, propulsors, control surfaces, or the like.

Figure 3:
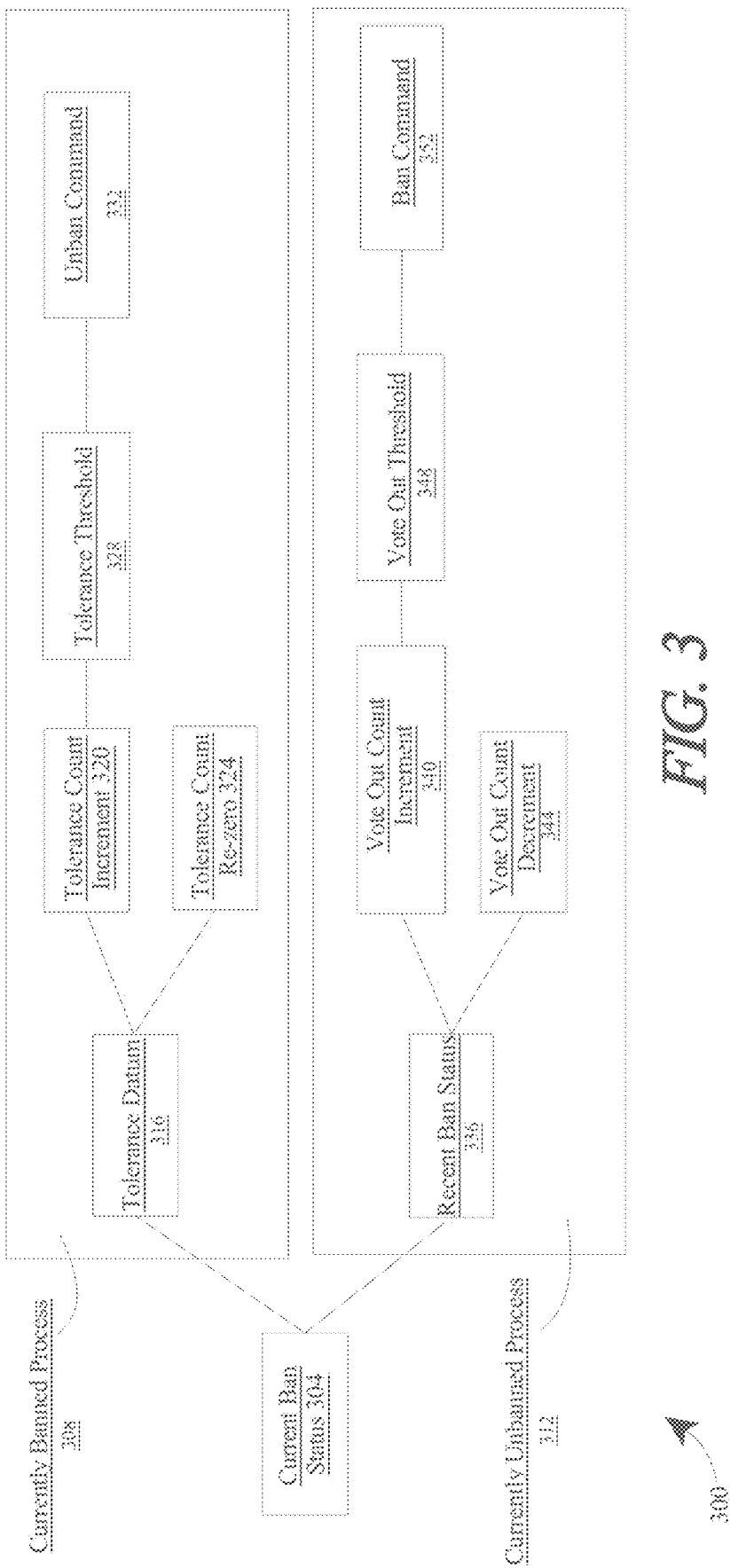
FIG. 3 is an exemplary embodiment of a banning algorithm configured for use in an embodiment of the invention.

Referring now to FIG. 3, banning algorithm 300 is presented in block diagram form. Banning algorithm includes current ban status 304. Current ban status 304 may be similar to or the same as any ban status as described herein. Current ban status 304 includes information or one or more elements of data referring to a component's current status as determined by one or more flight controllers 120. Current ban status 304 may include a binary value like 1 or 0, indicating currently banned or not currently banned. Current ban status 304 may include an electrical signal representing banned or unbanned status. One of ordinary skill in the art would appreciate, after reviewing the entirety of this disclosure, would appreciate the plurality of electrical indications of a component's current ban status 304 as used in this disclosure. If current ban status 304 indicates component is currently banned, currently banned process 308 is initiated. Tolerance datum 316 is determined by flight controller 120 as a range of values corresponding to a previously voted on value, such as output datum 224 or control surface datum 140. Tolerance datum 316 may be iteratively determined, mathematically manipulated or multiple iterations of a loop, such as in a computer code, or input by one or more personnel. Tolerance datum 316 indicates the range of values acceptable in currently banned process 308 that the component may be transmitting to continue to be trusted by flight controller 120. For example, and without limitation, if a currently banned component transmits an electrical signal that does not fall within the previously voted on tolerance datum 316, the tolerance count re-zero 324 is initiated. Tolerance count re-zero 324 is a state wherein the iterative process of unbanning a banned component is brought back to zero, making the process start all over again. If a currently banned component transmits a datum included in tolerance datum 716, then tolerance count increment 320 is initiated. Tolerance count increment 320 increases the tolerance count wherein a currently banned sensor may be unbanned by provided data that coincides with previously voted on datums. If tolerance count increment 320 increases past tolerance threshold 328, then the unban command 332 is initiated. For example, and without limitation, tolerance threshold 328 may be five, wherein an iterative process of reading a currently banned component's data must be within the threshold five times consecutively before the component is unbanned by unban command 332. Unban command 332 may be transmitted to flight controller 120, or directly to the newly unbanned component, like at least a sensor 104. To reiterate, and one of ordinary skill in the art would understand, after reviewing the entirety of this disclosure, that only unbanned components may participate in the voting performed by any of the herein described algorithms.

Continuing to refer to FIG. 3, if currently banned status 304 indicates the component is currently unbanned, then currently unbanned process 312 is initiated. If currently unbanned process 312 is initiated, then recent ban status 336 is determined. Recent ban status 336 indicates if the component was voted out in a previous iteration of signal transmission, i.e., the component was not transmitting active and admissible data consistent with the entirety of this disclosure. If currently unbanned component transmits data out of tolerance with the previously voted on data, vote out count increment 340 is initiated. Vote out count increment 340 indicates an increase in vote out count, the vote out count, if raised above vote out threshold 348, ban command 352 is initiated. If currently unbanned component has a recently banned status 336 indicating it has not been recently voted out, then vote out count decrement 344 is initiated. Vote out count decrement 344 decreases vote out count, further removing the currently unbanned component from being banned by ban command 352, indicating that the currently unbanned component is transmitting usable and accurate data. Currently banned process 308 and currently unbanned process 312 may be repeatedly performed before any components are banned or unbanned, performed in periodic intervals, performed in a specific order, performed simultaneously, performed on some components at a time, performed on all components simultaneously, among others.

Figure 4:
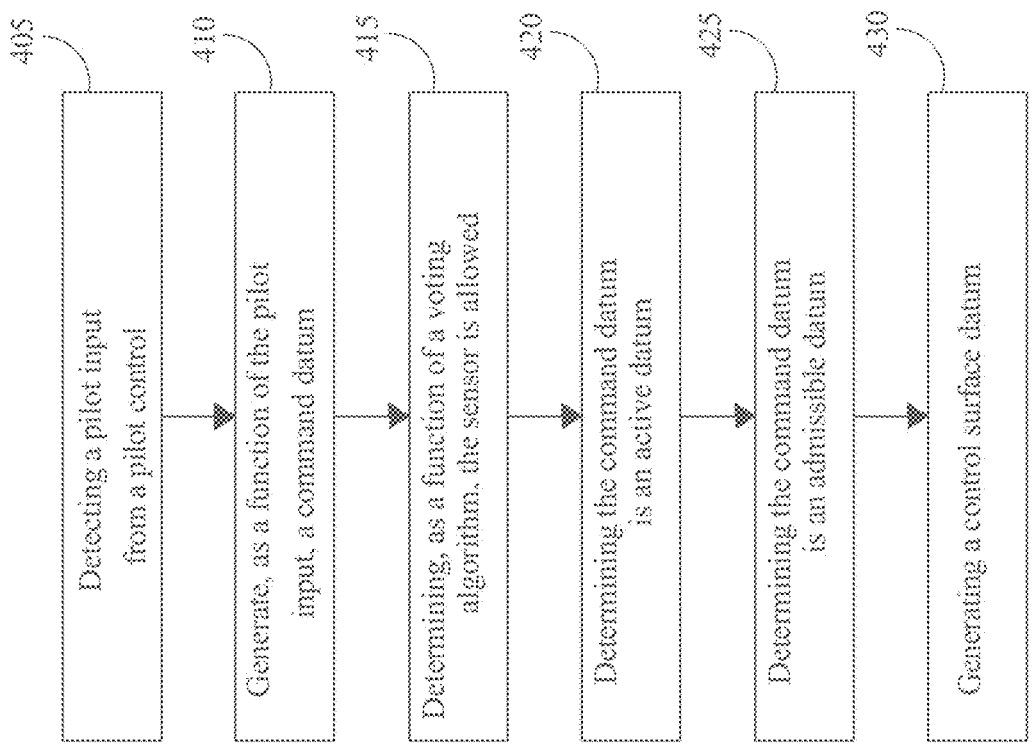
FIG. 4 is an exemplary method for fly-by-wire flight control configured for use in electric aircraft presented in process flow diagram form.

Referring now to FIG. 4, method 400 for fly-by-wire flight control configured for use in electric aircraft is presented in process flow diagram form. Method 400, at 405 includes detecting, at the at least a sensor 104, pilot input 112 from at least a pilot control 108. Pilot control 108 may include a directional control of an electric aircraft such as an inceptor stick, pedals, joysticks, steering wheels, among others. Pilot control 108 includes a throttle control of an electric aircraft, for example, a gas pedal, electric motor throttle control, or the like. Pilot control 108 may include any pilot control as described herein. The at least a sensor 104 may include a motion sensor. The motion sensor may be any motion sensor as described herein.

Method 400, at step 410, includes generating, as a function of pilot input 112, at least a command datum 116. Pilot input 112 may be the movement of pilot control 108 indicating a pilot's desire to alter aircraft heading. Pilot input 112 may be any pilot input as described herein.

Method 400, at step 415, includes determining, at flight controller 120, as a function of voting algorithm 124, that the at least a sensor 104 is an allowed sensor 128. Flight controller 120 may be any flight controller as described herein. Allowed sensor 128 may be any sensor as described herein. Voting algorithm 124 may be any voting algorithm as described herein. Voting algorithm 124 may utilize one or more machine-learning processes.

Method 400, at step 420, includes determining that the at least a command datum 116 is an active datum. The command datum 116 may be any command datum as described herein. The active datum 132 may be any active datum as described herein. Flight controller 120 is configured to ban the at least a sensor 104 that transmitted a command datum 116 determined to not be an active datum 132.

Method 400, at step 425, includes determining that the at least a command datum 116 is an admissible datum 136. The admissible datum 136 may be any admissible datum as described herein. Flight controller 120 is configured to ban the at least a sensor 104 that transmitted command datum 116 determined to not an admissible datum 136.

Method 400, at step 430, includes generating, as a function of the at least a command datum 116 and the allowed sensor 128, control surface datum 140 correlated to pilot input 112. Allowed sensor 128 may be any allowed sensor as described herein. Control surface datum 140 may be any control surface datum or equivalent signal as described herein. Control surface datum 140 may include the mean of the plurality of included command datums 116 from the plurality of allowed sensors 128. Control surface may include an aileron mechanically coupled to an electric aircraft. Control surface may include a propulsor mechanically coupled to an electric aircraft. Control surface includes any control surface as described herein. Propulsor includes any propulsor as described herein.

Figure 5:
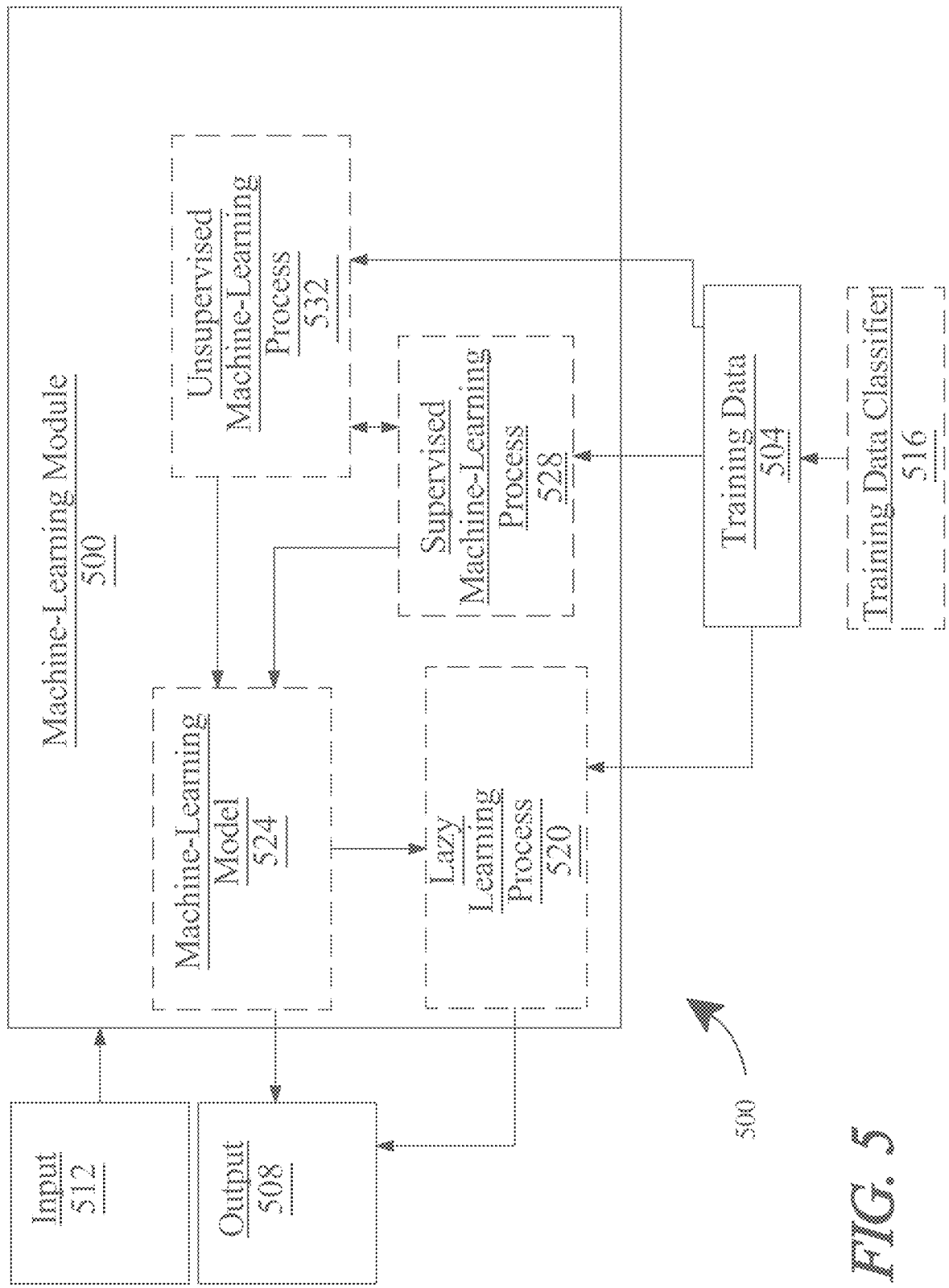
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language. Machine-learning module may be generated by one or more flight controllers or one or more computing devices consistent with the entirety of this disclosure. A generated machine-learning module may be used to configure or reconfigure one or more voting algorithms consistent with the entirety of this disclosure using software, firmware, and/or configuration or reconfiguration of a field-programmable gate array (FPGA) or other hardware component. Machine-learning module may configure or reconfigure voting algorithms by tuning one or more coefficients, weights, and/or parameters using in voting algorithms such as tolerance thresholds, vote out thresholds, or other limits within voting algorithm and/or mathematical combinations performed for and/or in voting algorithm. For example, and without limitation, machine-learning module may tune a lower coefficient and/or threshold for a vote out threshold, which may result in a vote out threshold baseline multiplied by the tuned lower weight, resulting in a lesser value for the vote out threshold; that lesser vote out threshold may then be more likely to vote out command datums within voting algorithm.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example at least a command datum 116 may be input, wherein a control surface datum 140 is outputted.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to classes of deficiencies, wherein a nourishment deficiency may be categorized to a large deficiency, a medium deficiency, and/or a small deficiency.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include at least a command datum 116 as described above as one or more inputs, one or more control surface datum 140 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
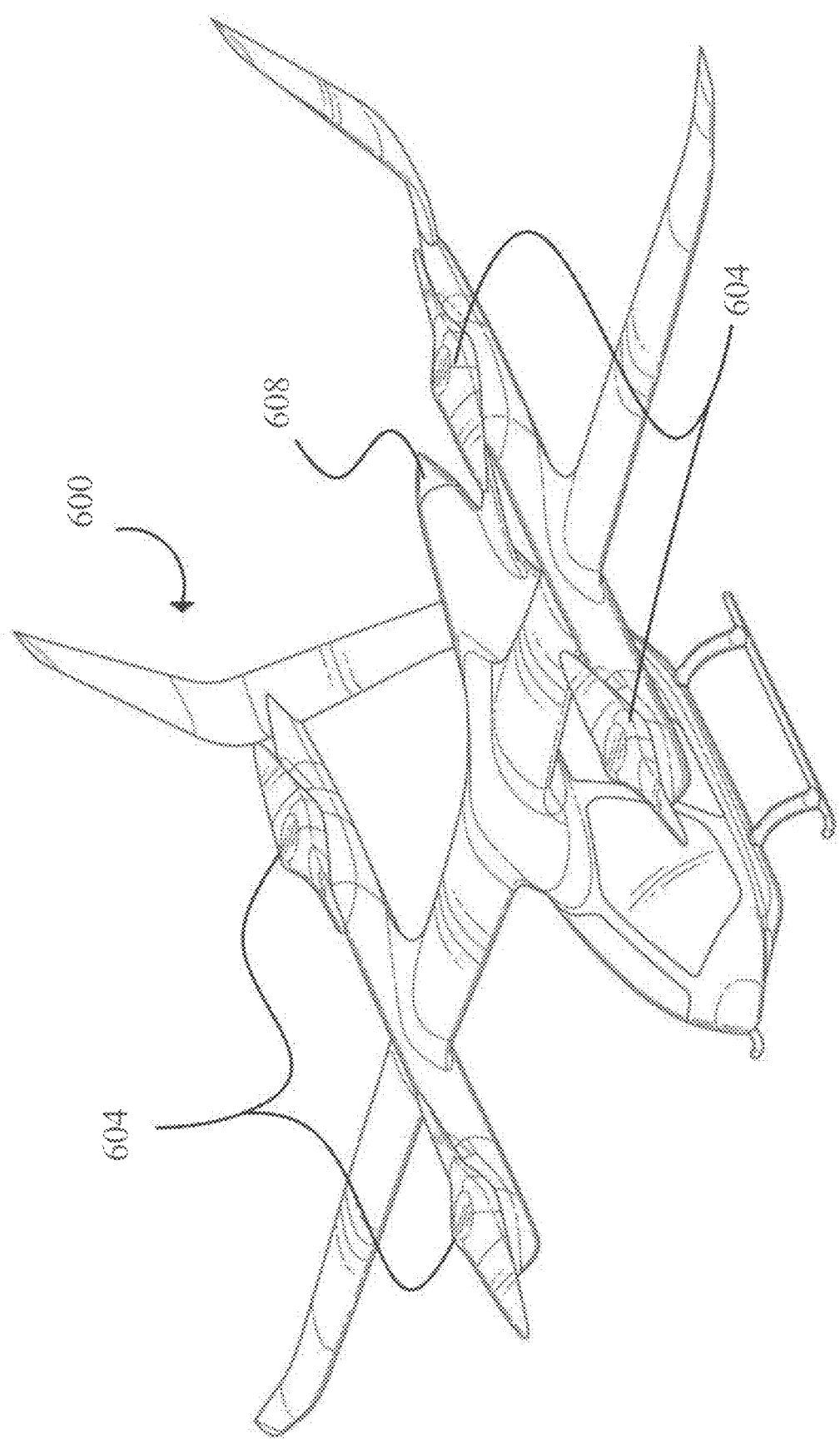
FIG. 6 is an illustration of an embodiment of an electric aircraft.

Referring now to FIG. 6, an embodiment of an electric aircraft 600 is presented. Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of an electric aircraft 600, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Referring still to FIG. 6, Aircraft may include at least a vertical propulsor 604 and at least a forward propulsor 608. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in a upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 604 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 6, at least a forward propulsor 608 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 604 and at least a forward propulsor 608 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 6, during flight, a number of forces may act upon the electric aircraft. Forces acting on an aircraft 600 during flight may include thrust, the forward force produced by the rotating element of the aircraft 600 and acts parallel to the longitudinal axis. Drag may be defined as a rearward retarding force which is caused by disruption of airflow by any protruding surface of the aircraft 600 such as, without limitation, the wing, rotor, and fuselage. Drag may oppose thrust and acts rearward parallel to the relative wind. Another force acting on aircraft 600 may include weight, which may include a combined load of the aircraft 600 itself, crew, baggage and fuel. Weight may pull aircraft 600 downward due to the force of gravity. An additional force acting on aircraft 600 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
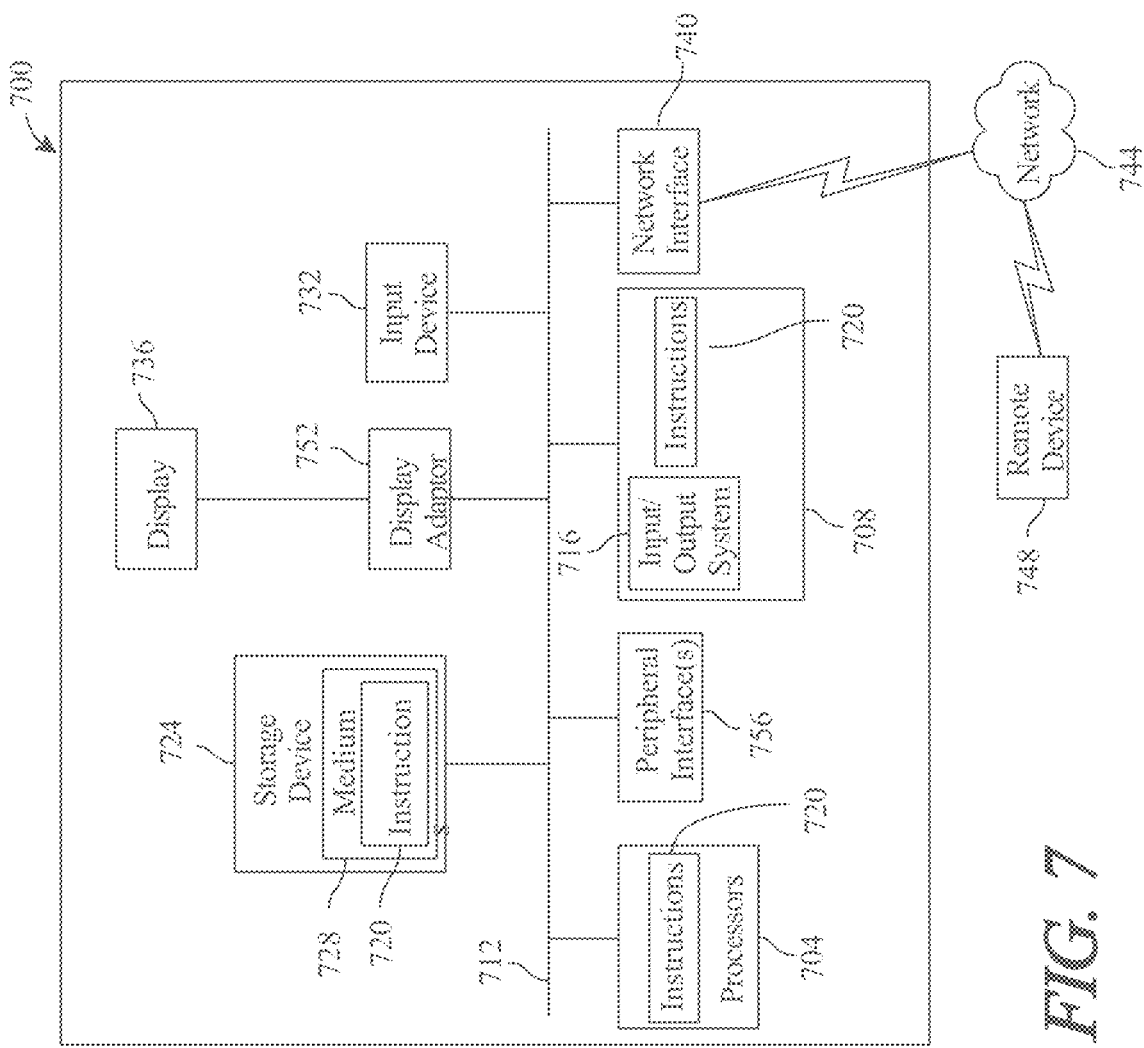
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for fly-by-wire flight control configured for use in an electric aircraft, the system comprising:
    a flight controller configured to perform a voting algorithm, wherein performing the voting algorithm comprises:
        receiving a command datum from a sensor;
        determining, based at least in part on a temporal element, the command datum is an active datum;
        determining the command datum is an admissible datum; and
        generating, based at least in part on determining that the command datum is an admissible datum and that the command datum is an active datum, an electrical signal; and
    an actuator communicatively connected to the flight controller, the actuator configured to:
        receive the electrical signal from the flight controller; and
        adjust a thrust of a propulsor or a position of a control surface based at least in part on the electrical signal.

2. The system of claim 1, wherein determining the command datum is an admissible datum comprises determining the command datum represents an adjustment of an aircraft component within an admissible range of adjustments for the aircraft component.

3. The system of claim 2, wherein the admissible range of adjustments is based at least in part on one or more of an environmental condition or an aircraft condition.

4. The system of claim 1, wherein:
    the control surface comprises a hinged surface which forms part of a trailing edge of a wing in a fixed wing aircraft; and
    the actuator is further configured to control the hinged surface based at least in part on the electrical signal.

5. The system of claim 1, wherein the command datum comprises the electrical signal.

6. The system of claim 1, wherein the sensor is communicatively coupled to a pilot control remotely located outside the electric aircraft.

7. The system of claim 6, wherein receiving the command datum from the sensor comprises:
    detecting a pilot input from the pilot control; and
    generating the command datum based at least in part on the pilot input.

8. The system of claim 1, wherein the flight controller is configured to determine the sensor is an allowed sensor.

9. The system of claim 8, wherein determining the sensor is an allowed sensor comprises receiving a ban status associated with the sensor.

10. The system of claim 1, wherein determining the command datum is an admissible datum is further based at least in part on environmental conditions.

11. A method for fly-by-wire flight control configured for use in electric aircraft, the method comprising:
   receiving, at a flight controller, a command datum from a sensor;
   determining, at the flight controller, based at least in part on a temporal element, the command datum is an active datum;
   determining, at the flight controller, the command datum is an admissible datum;
   generating, based at least in part on determining the command datum is an admissible datum and the command datum is an active datum, an electrical signal;
   receiving, by an actuator communicatively connected to the flight controller, the electrical signal from the flight controller; and
   adjusting, by the actuator, based at least in part on the electrical signal, a thrust of a propulsor or a position of a control surface.

12. The method of claim 11, wherein determining the command datum is an admissible datum comprises determining, at the flight controller, the command datum represents an adjustment of an aircraft component within an admissible range of adjustments for the aircraft component.

13. The method of claim 12, wherein the admissible range of adjustments is based at least in part on one or more of an environmental condition or an aircraft condition.

14. The method of claim 11, wherein:
   the control surface comprises a hinged surface which forms part of a trailing edge of a wing in a fixed wing aircraft; and
   the method further comprises, controlling, by the actuator, the hinged surface based at least in part on the electrical signal.

15. The method of claim 11, wherein the command datum comprises the electrical signal.

16. The method of claim 11, wherein the sensor is communicatively coupled to a pilot control remotely located outside the electric aircraft.

17. The method of claim 16, wherein receiving, at the flight controller, the command datum from the sensor comprises:
   detecting, at the flight controller, a pilot input from the pilot control; and
   generating, at the flight controller, the command datum based at least in part on the pilot input.

18. The method of claim 11, further comprising determining, at the flight controller, the sensor is an allowed sensor.

19. The method of claim 18, wherein determining, at the flight controller, the sensor is an allowed sensor comprises receiving, at the flight controller, a ban status associated with the sensor.

20. The method of claim 11, wherein determining, at the flight controller, the command datum is an admissible datum is further based at least in part on environmental conditions.

* * * * *